No. 703,067. Patented June 24, 1902.
G. A. HUNT.
EXHAUST CONCEALER.
(Application filed June 3, 1901.)

(No Model.) 2 Sheets—Sheet 1.

WITNESSES: INVENTOR:

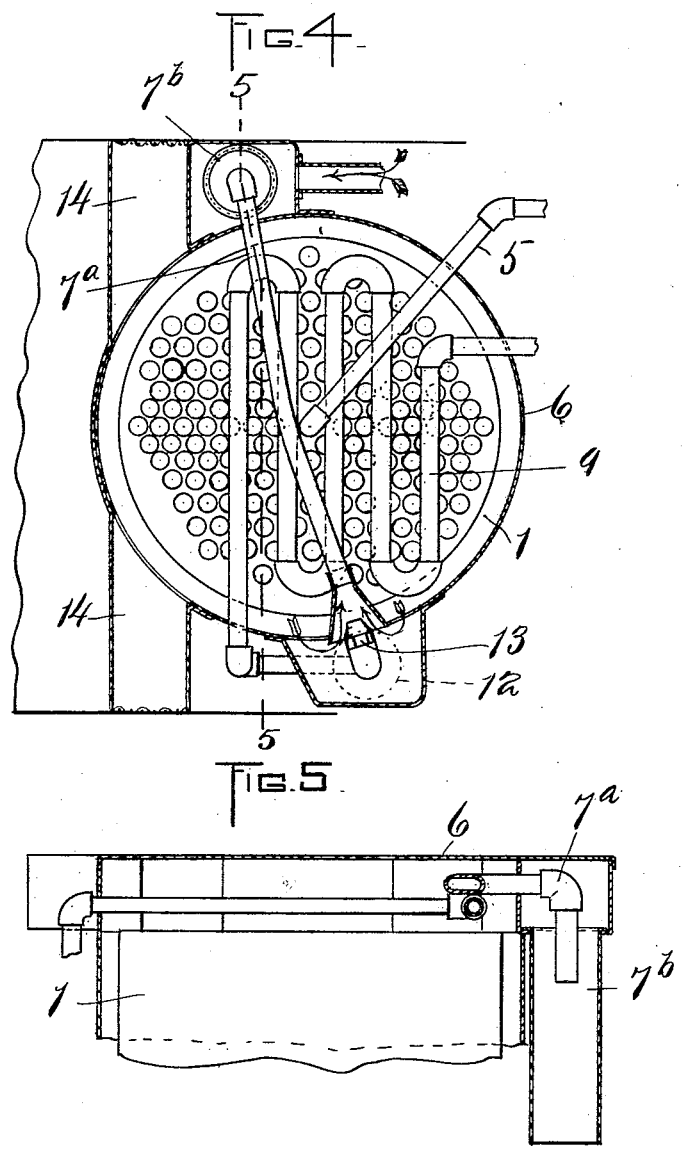

UNITED STATES PATENT OFFICE.

GEORGE A. HUNT, OF EVERETT, MASSACHUSETTS, ASSIGNOR OF ONE-HALF TO F. C. ALDEN, OF READING, MASSACHUSETTS.

EXHAUST-CONCEALER.

SPECIFICATION forming part of Letters Patent No. 703,067, dated June 24, 1902.

Application filed June 3, 1901. Serial No. 62,895. (No model.)

*To all whom it may concern:*

Be it known that I, GEORGE A. HUNT, of Everett, in the county of Middlesex and State of Massachusetts, have invented certain new and useful Improvements in Exhaust-Concealers, of which the following is a specification.

This invention has for its object to conceal or render substantially invisible an atmospheric steam-exhaust; and it consists in the improvements hereinafter described and claimed.

Figure 1:
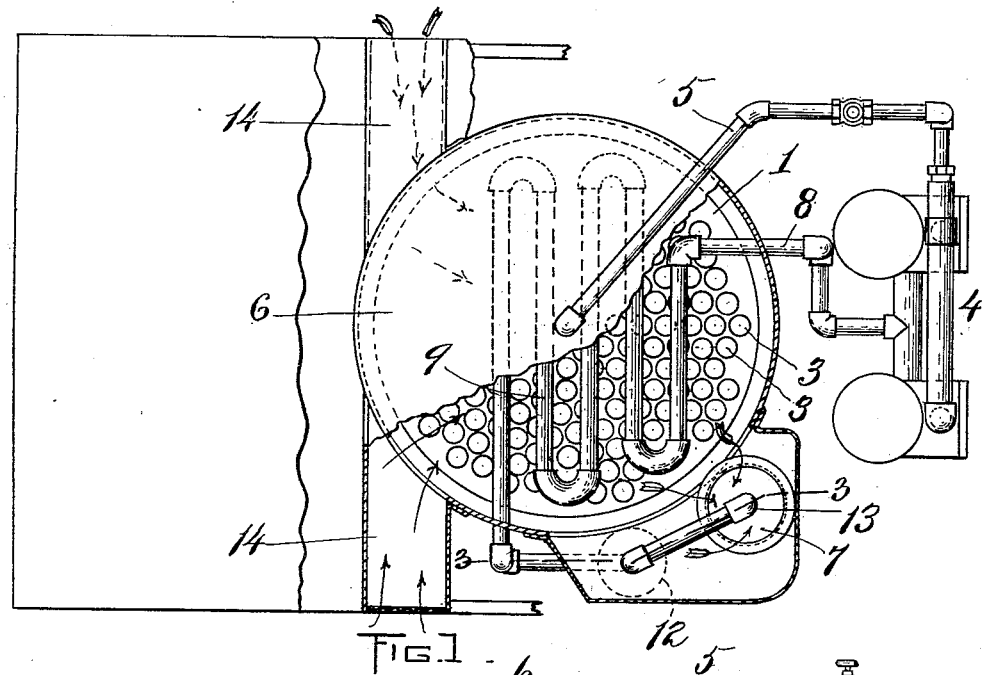
Figure 2:
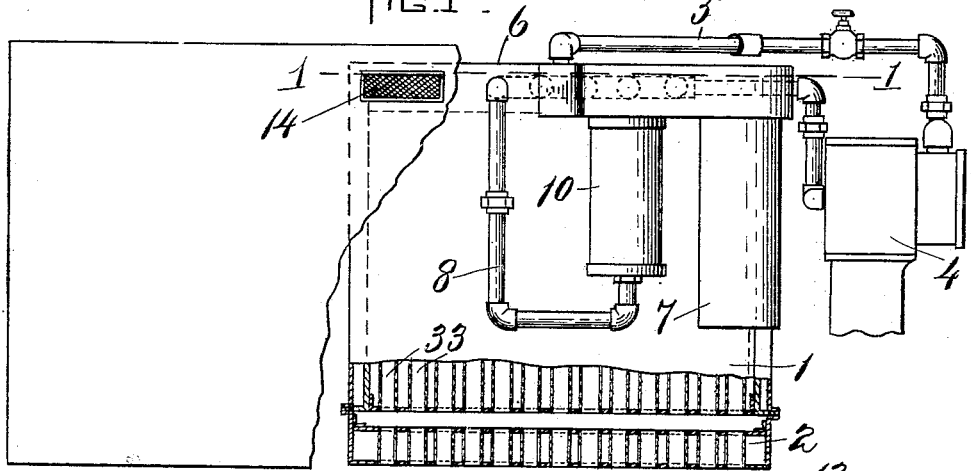
Figure 3:
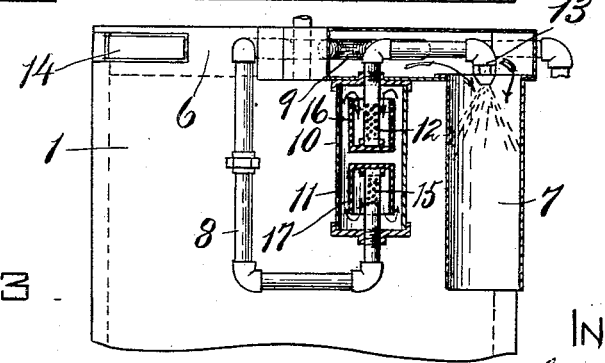

Of the accompanying drawings, Figure 1 represents a plan view, partly broken away and in section, of an embodiment of my invention. Fig. 2 represents a side elevation with parts broken away. Fig. 3 represents a section on line 3 3 of Fig. 1. Fig. 4 represents a horizontal section showing a modification. Fig. 5 represents a section on the line 5 5 of Fig. 4.

The same reference characters indicate the same parts in all of the figures.

It is well known that water at ordinary temperatures when exposed to the air will evaporate or become converted into invisible vapor, this evaporation being distinguished from ebullition or boiling only in degree and by the fact that evaporation takes place only from the surface of the water. Among the causes which influence rapidity of evaporation of water are, first, the temperature of the water; second, the quantity of water-vapor already in the atmosphere; third, the renewal of this atmosphere; fourth, the extent of the surface of evaporation. When steam is exhausted into the atmosphere under ordinary conditions, it condenses into a visible cloud or mist composed of innumerable very fine particles of water. Owing to the great surface exposed by these particles the cloud very quickly vanishes by evaporation; but its disappearance is more rapid on a warm day than on a cold day, because of the fact that the water particles are allowed to retain their heat, and is more rapid in a dry atmosphere than in a damp atmosphere, because of the presence of a less quantity of water-vapor in the dry atmosphere. Inasmuch as the atmosphere is rarely completely saturated with water-vapor, so as to be incapable of taking up any more vapor, it is possible by insuring the presence in a sufficient degree of the two factors—namely, heat and rapid renewal of air-supply, together with ample surface of absorption—to prevent a steam-exhaust from entering to an appreciable extent upon the intermediate stage of a mist cloud and instead to cause it practically to be directly absorbed into the atmosphere in an invisible condition. Upon the above principles the operation of my invention depends. It has a very useful application to steam-propelled automobile vehicles, from which a visible exhaust on the road is a disagreeable feature.

In carrying out my invention I employ an air-mixer in which the force of the exhaust itself is employed to effect a rapid renewal of the air-supply and to so thoroughly mix the air with the exhaust-steam as to afford the maximum absorbing-surface of air in contact with the steam and to which the air is supplied in a heated condition. Prior to its reaching the air-mixer the steam itself is heated to dry it or free it from water of condensation.

1 represents a boiler having a heater 2 and flues or fire-tubes 3 3 for carrying the products of combustion from said heater through the boiler, and 4 represents an engine supplied with steam from said boiler through a steam-pipe 5.

6 represents a bonnet inclosing a chamber above the top of the boiler, which constitutes a flue and from which opens downwardly a tube 7.

8 is the exhaust-conduit of the engine, in which are included a coil 9, located in the bonnet-chamber over the boiler-flues 3 3 and constituting a drier for the steam, a muffler 10, comprising an enlarged outer casing 11, having a perforated outlet 12, a perforated inlet 15, and cup-shaped baffles 16 16, surrounding said inlet and outlet, and a discharge nozzle or outlet 13, directed downwardly into the tube 7.

14 14 are elevated tubes forming lateral communications between the atmosphere and the bonnet-chamber or flue.

When the engine is exhausting, the exhaust passing through the coil 9 is dried or superheated by the heat communicated to said coil, owing to its position in the path of the products of combustion, the steam being thereby rid of water of condensation and brought into a condition to be more readily dissipated in an invisible condition by its subsequent treatment. In the muffler 10 the steam pursues a tortuous path and is baffled and retarded with the effect of equalizing or merging the successive discharges or puffs of the engine into a more or less continuous discharge having a maximum propelling power. The emission of the exhaust from the nozzle 13 into the tube 7 induces a downward draft in said tube of air entering the bonnet chamber or flue at the inlets 14 14. Such air is heated by passage over the hot surfaces of the boiler and the bonnet-flue and by mingling with the products of combustion from the heater 2. The heated and rapidly-renewed air-supply becomes intimately mingled with the exhaust-steam, checking and preventing the condensation of the steam into a mist cloud and facilitating its direct absorption by the air, with the result that the discharge from the lower end of the tube 7 is substantially or wholly invisible. I have ascertained that a direct and plentiful supply of heated air, such as that obtained from a flue having a direct-air inlet or inlets of the described character, is essential for obtaining the best results from my invention. The tube 7 constitutes an outlet through which the products of combustion are disposed of when there is an exhaust from the engine by the induction of said exhaust. At times when there is no exhaust the tubes 14 constitute a natural outlet for the products of combustion.

Figs. 4 and 5 represent a modification in which the exhaust-nozzle 13 is directed into the flaring entrance of an elongated mixing-tube 7ª, which extends horizontally across the top of the boiler and has its discharge end directed downwardly into a mixing-tube 7ᵇ, similar to the tube 7, hereinbefore described, but mounted on the opposite side of the boiler. The tube 7ª takes hot air received through the inlets 14, and the tube 7ᵇ takes the atmosphere at normal temperature. The mixture of the exhaust-steam with air is thus effected in two stages and more gradually than by the first-described arrangement and somewhat more quietly when the engine is doing heavy duty.

I do not hold myself to the exact construction and arrangement of parts herein set forth, as considerable variation may be made without departing from the spirit of my invention.

I claim—

1. In an exhaust-concealer, the combination of a boiler having a space above it for products of combustion said space forming a flue, an exhaust-conduit located in said flue, an exhaust-discharge outlet at one end of the flue, an air-mixer associated with said outlet, and an air-inlet for supplying air directly to said flue and disposed relatively to the air-mixer to cause the supply of air on its way to the air-mixer to pass through the entire combustion space or flue over the boiler, whereby the air and steam are dried and heated prior to being mixed.

2. In an exhaust-concealer, the combination of a boiler having a space above it for products of combustion said space forming a flue, an exhaust-conduit located in said flue, a muffler in said conduit, an exhaust-discharge outlet at one end of the flue, an air-mixer associated with said outlet, and an air-inlet for supplying air directly to said flue and disposed relatively to the air-mixer to cause the supply of air on its way to the air-mixer to pass through the entire combustion space or flue over the boiler, whereby the air and steam are dried and heated prior to being mixed.

3. In an exhaust-concealer, the combination of a boiler a heater therefor, an engine supplied by said boiler, a flue for disposing of the products of combustion, an engine exhaust-conduit located in said flue, an exhaust-discharge outlet at one end of the flue, a downwardly-opening air-mixer associated with said outlet and forming an outlet for the flue, and an air-inlet for supplying air to said flue and disposed relatively to the air-mixer to cause the supply of air on its way to the air-mixer to pass through said flue over the boiler, whereby the air and steam are dried and heated prior to being mixed.

In testimony whereof I have affixed my signature in presence of two witnesses.

GEORGE A. HUNT.

Witnesses:
C. F. BROWN,
F. C. ALDEN.